(12) United States Patent
Suzue

(10) Patent No.: US 9,633,194 B2
(45) Date of Patent: Apr. 25, 2017

(54) AUTHENTICATION SYSTEM, ELECTRONIC APPARATUS AND AUTHENTICATION METHOD

(71) Applicant: Tadashi Suzue, Toyohashi (JP)

(72) Inventor: Tadashi Suzue, Toyohashi (JP)

(73) Assignee: KONICA MINOLTA BUSINESS TECHNOLOGIES, INC., Tokyo (JP)

( * ) Notice: Subject to any disclaimer, the term of this patent is extended or adjusted under 35 U.S.C. 154(b) by 345 days.

(21) Appl. No.: 13/851,704

(22) Filed: Mar. 27, 2013

(65) Prior Publication Data

US 2013/0263219 A1 Oct. 3, 2013

(30) Foreign Application Priority Data

Mar. 28, 2012 (JP) ................................. 2012-074326

(51) Int. Cl.
*G06F 21/40* (2013.01)
*G06F 21/31* (2013.01)

(52) U.S. Cl.
CPC .............. *G06F 21/40* (2013.01); *G06F 21/31* (2013.01)

(58) Field of Classification Search
CPC .................................. G06F 21/40; G06F 21/31
USPC ............................................................. 726/3
See application file for complete search history.

(56) References Cited

U.S. PATENT DOCUMENTS

| | | | |
|---|---|---|---|
| 7,793,340 B2* | 9/2010 | Kiester et al. ..................... 726/4 |
| 2004/0004731 A1* | 1/2004 | Itagaki ................. H04N 1/6094 |
| | | | 358/1.9 |
| 2004/0121760 A1* | 6/2004 | Westman ................ H04L 63/08 |
| | | | 455/411 |
| 2004/0205262 A1* | 10/2004 | Ikeno .................. G03G 15/5079 |
| | | | 710/15 |
| 2005/0172118 A1* | 8/2005 | Nasu ....................... G03G 21/04 |
| | | | 713/156 |
| 2005/0254086 A1* | 11/2005 | Shouno ................. G06F 21/608 |
| | | | 358/1.15 |
| 2006/0095566 A1* | 5/2006 | Kanai ..................... H04L 12/24 |
| | | | 709/224 |
| 2007/0236330 A1* | 10/2007 | Cho et al. ..................... 340/5.54 |
| 2008/0256459 A1* | 10/2008 | Sekiya .......................... 715/741 |

(Continued)

FOREIGN PATENT DOCUMENTS

| | | |
|---|---|---|
| CN | 1691608 A | 11/2005 |
| CN | 101287052 A | 10/2008 |

(Continued)

OTHER PUBLICATIONS

Chinese Office Action (and English translation thereof) dated Dec. 3, 2015, issued in Chinese Application No. 201310103909.5.

(Continued)

*Primary Examiner* — Matthew Henning
(74) *Attorney, Agent, or Firm* — Holtz, Holtz & Volek PC

(57) ABSTRACT

Disclosed is an authentication system including: an electronic apparatus; and a remote operating device to remotely operate the electronic apparatus, wherein the electronic apparatus comprises a main controller to control the electronic apparatus and a sub-controller to control the electronic apparatus independently from the main controller; and wherein in case that the remote operating device accesses to the electronic apparatus, after the main controller carries out a first user authentication, the sub-controller carries out a second user authentication.

21 Claims, 8 Drawing Sheets

(56) References Cited

U.S. PATENT DOCUMENTS

| | | | |
|---|---|---|---|
| 2009/0251724 A1* | 10/2009 | Nakajima | G06F 21/608 358/1.15 |
| 2010/0251342 A1* | 9/2010 | Uchikawa | G06F 21/81 726/4 |
| 2011/0001999 A1* | 1/2011 | Nanaumi | 358/1.14 |
| 2013/0081146 A1* | 3/2013 | Hakozaki | H04N 1/00222 726/28 |

FOREIGN PATENT DOCUMENTS

| | | |
|---|---|---|
| CN | 101945193 A | 1/2011 |
| JP | 2004-363969 A | 12/2004 |
| JP | 2005-011090 A | 1/2005 |
| JP | 2005-321944 A | 11/2005 |
| JP | 2006-042309 A | 2/2006 |
| JP | 2006-059083 A | 3/2006 |

OTHER PUBLICATIONS

Chinese Office Action (and English translation thereof) dated Aug. 3, 2016, issued in counterpart Chinese Application No. 201310103909.5.

\* cited by examiner

AUTHENTICATION SYSTEM, ELECTRONIC APPARATUS AND AUTHENTICATION METHOD

BACKGROUND OF THE INVENTION

Field of the Invention

The present invention relates to an authentication system, an electronic apparatus and an authentication method for carrying out the user authentication when the electronic apparatus is remotely operated.

Description of Related Art

When a user or an administrator of an electronic apparatus, such as an image forming apparatus remotely operates the electronic apparatus from a remote operating device, such as an external device (for example, a PC (personal computer)), it is known that the electronic apparatus authenticates the user or the like who carries out the remote operation (see, for example, the following Japanese Patent Application Publications).

In the Japanese Patent Application Publications No. 2006-59083 and No. 2006-42309, the remote operating system having the authentication device is disclosed.

In the Japanese Patent Application Publication No. 2004-363969, the user authentication method to be carried out in the remote operating system having a plurality of remote operating devices and a plurality of electronic apparatuses is disclosed.

In the Japanese Patent Application Publication No. 2005-321944, in the remote operating system having the function for authenticating the user, it is disclosed that the image forming apparatus which is the electronic apparatus to be remotely operated by the remote operating device prohibits the user from inputting the operation to the operation panel of the image forming apparatus when the remote operating device remotely operates the image forming apparatus.

In the Japanese Patent Application Publication No. 2005-11090, it is disclosed that the image forming apparatus comprises an authentication unit for authenticating the user who carries out the remote operation and a control unit for controlling the remote operating device so as to display the operation window corresponding to the user.

By the user authentication, it is possible to avoid the problems (for example, the discrepancy between the operations for the electronic apparatus, or the like) caused by remotely operating the main body of the electronic apparatus.

In recent years, there are electronic apparatuses in which in addition to the main controller for controlling the main body of the electronic apparatus, the sub-controller for controlling the electronic apparatus independently from the main controller is provided.

Because the sub-controller is independent from the main controller, the user or the like can remotely operate the electronic apparatus via the sub-controller without the user authentication carried out by the main controller. Therefore, even though the main controller is in the shutdown condition, sub-controller can execute the operation for the electronic apparatus. For example, even though the main body of the electronic apparatus is powered off and the OS (Operating System) program of the electronic apparatus does not respond, the user or the like can remotely monitor, diagnose or repair the electronic apparatus via the sub-controller by using an external device. Further, because the sub-controller does not depend on the operating status of the main controller, it is possible to ensure the stable processing ability.

However, on the other hand, the user or the like whom the main controller does not authenticate remotely operates the electronic apparatus. In the above electronic apparatus, the problem which could be avoided by the conventional user authentication was caused again.

SUMMARY

To achieve at least one of the abovementioned objects, an authentication system reflecting one aspect of the present invention, comprises:

an electronic apparatus; and a remote operating device to remotely operate the electronic apparatus, wherein the electronic apparatus comprises a main controller to control the electronic apparatus and a sub-controller to control the electronic apparatus independently from the main controller; and wherein in case that the remote operating device accesses to the electronic apparatus, after the main controller carries out a first user authentication, the sub-controller carries out a second user authentication.

Preferably, the main controller comprises a storing unit to store authentication information for carrying out the second user authentication by the sub-controller, after the main controller carries out the first user authentication, the main controller transmits the authentication information to the remote operating device, when the remote operating device accesses to the sub-controller, the remote operating device transmits the authentication information received from the main, controller to the sub-controller, and the sub-controller carries out the second user authentication in accordance with the authentication information received from the remote operating device.

Preferably, the main controller obtains the authentication information for carrying out the second user authentication by the sub-controller, from the sub-controller, and transmits the obtained authentication information to the remote operating device.

Preferably, the main controller comprises a storing unit to store first authentication information for carrying out the first user authentication by the main controller, and to store second authentication information for carrying out the second user authentication by the sub-controller, the first authentication information being assigned to a plurality of users, respectively, and the second authentication information being assigned to the plurality of users, respectively, after the main controller carries out the first user authentication in accordance with the first authentication information corresponding to a user who remotely operates the electronic apparatus, from the first authentication information stored in the storing unit, the main controller transmits the second authentication information corresponding to the user for whom the first user authentication is carried out, from the second authentication information stored in the storing unit, to the remote operating device and the sub-controller, when the remote operating device accesses to the sub-controller, the remote operating device transmits the second authentication information received from the main controller, to the sub-controller, and the sub-controller carries out the second user authentication in accordance with the second authentication information received from the remote operating device and the second authentication information received from the main controller.

Preferably, after the main controller carries out the first user authentication, the main controller transmits a plug-in for remotely operating the electronic apparatus via the sub-controller, to the remote operating device.

Preferably, after the sub-controller carries out the second user authentication, the main controller carries out a lock of an operation window of the electronic apparatus.

Preferably, after a remote operation which is carried out for the electronic apparatus by the remote operating device is finished, the main controller cancels the lock of the operation window of the electronic apparatus.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF PREFERRED EMBODIMENT

Hereinafter, a preferred embodiment of the present invention will be explained with reference to the accompanying drawings.

Figure 1:
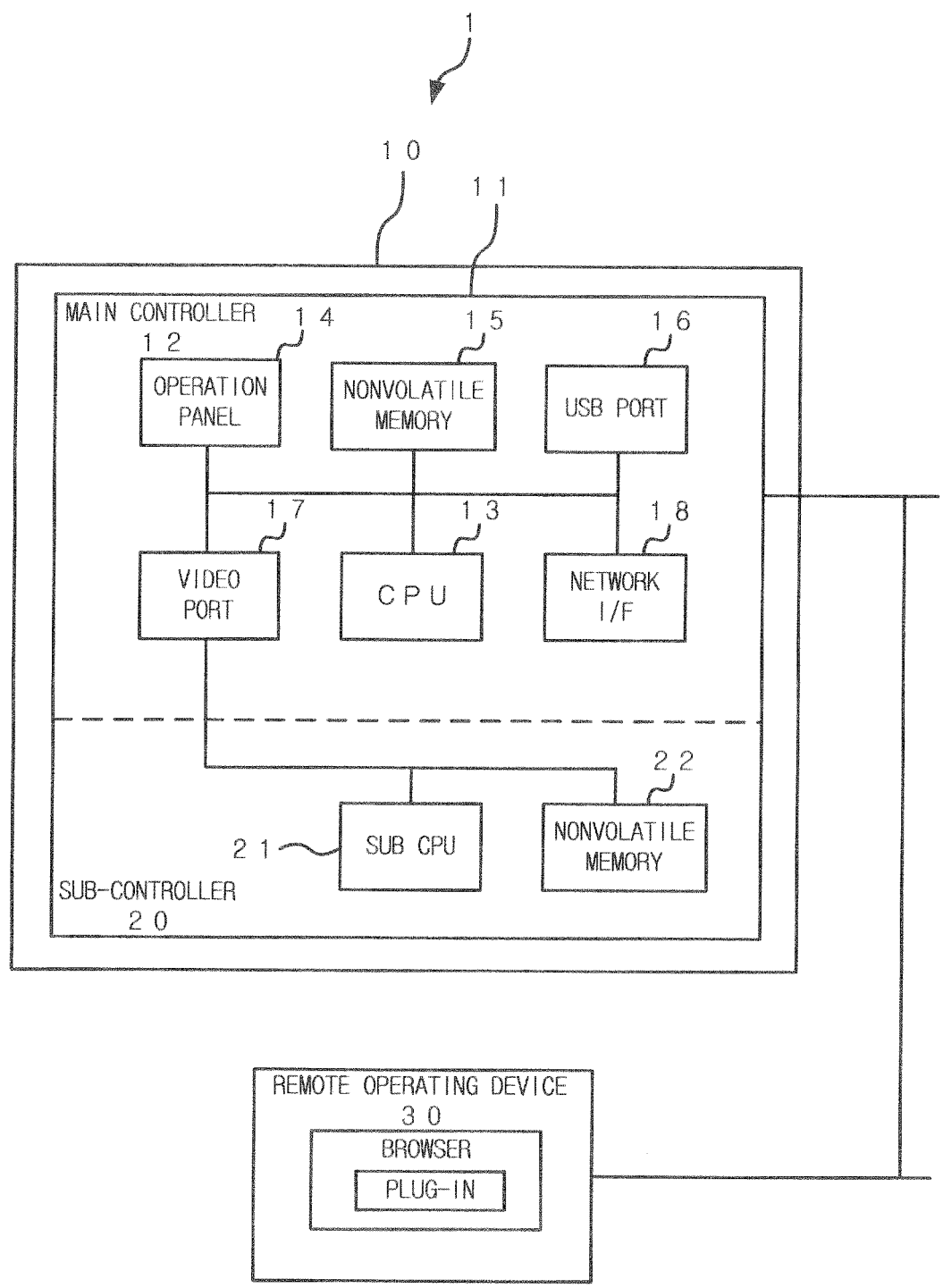
FIG. 1 is an explanatory view showing the schematic configuration of the authentication system according to the embodiment.

FIG. 1 is an explanatory view showing the schematic configuration of the authentication system 1 according to the embodiment.

The authentication system 1 comprises an electronic apparatus 10 (for example, an image forming apparatus or the like) and a remote operating device 30 (for example, a PC or the like) for remotely operating the electronic apparatus 10.

The electronic apparatus 10 comprises a control unit 11 for wholly controlling the electronic apparatus 10.

The control unit 11 comprises a main controller 12 for controlling the electronic apparatus 10 and a sub-controller 20 for controlling the electronic apparatus 10 independently from the main controller 12.

The main controller 12 comprises a CPU (Central Processing Unit) 13, an operation panel 14, a nonvolatile memory 15, a USB (Universal Serial Bus) port 16, a video port 17 and network I/F (Interface) 18.

By the CPU 13, a middleware, application programs and the like are executed on an OS (Operating System) program as a base. Then, the CPU 13 controls the electronic apparatus 10. The CPU 13 instructs the electronic apparatus 10 to execute various operations in accordance with the input signals from the operation panel 14 or the remote operating device 30.

Further, when the remote operating device 30 accesses to the electronic apparatus 10, the CPU 13 carries out the user authentication via a web server by the http (Hyper Text Transfer Protocol) protocol.

The operation panel 14 comprises a liquid crystal display (LCD) and a touch panel which is provided on the screen of the liquid crystal display and detects the coordinate position at which the screen is touched with the user's finger, a pen or the like. The operation panel 14 receives a job, setting conditions and the like for executing various types of operations of the electronic apparatus 10, which are input by the user, the administrator of the electronic apparatus 10 or the like. Further, as necessary, the operation panel 14 receives the registration of the authentication information which is required for the user authentication carried out by the main controller 12 and the sub-controller 20.

The nonvolatile memory 15 is a rewritable memory (flash memory) in which the stored contents are not damaged even if the electronic apparatus 10 is turned off. The nonvolatile memory 15 is used for storing various types of setting information and the like. As a storing unit, in the nonvolatile memory 15, the authentication information (first authentication information) which is used when the main controller 12 carries out the user authentication (first user authentication) and the authentication information (second authentication information) which is used when the sub-controller 20 carries out the user authentication (second user authentication), is stored.

Further, in the nonvolatile memory 15, the KVM (Keyboard/Video/Mouse) remote panel plug-in for remotely operating the electronic apparatus 10 via the sub-controller 20 by the remote operating device 30, is stored.

The USB port 16 is a port for connecting an apparatus having the USB terminal. For example, when the USB authentication key is connected to the USB port 16, the CPU 13 carries out the user authentication by using the USB authentication key.

The video port 17 is a port for transmitting the operation window (remote panel) for remotely operating the electronic apparatus 10 by the remote operating device 30 as video signals to the remote operating device 30.

The network 18 has the function to communicate the data between the remote operating device 30 and the electronic apparatus 10 to remotely operate the electronic apparatus 10 by the remote operating device 30 via a network, such as a LAN (Local Area Network), the Internet or the like. In particular, the network I/F 18 has the function to receive the first authentication information which is required for the user authentication carried out by the main controller 12 from the remote operating device 30, and to transmit the KVM remote panel plug-in and the like for remotely operating the electronic apparatus 10 by the remote operating device 30 via the sub-controller 20, to the remote operating device 30.

The sub-controller 20 comprises a sub CPU 21 and a nonvolatile memory 22.

The sub CPU 21 controls the electronic apparatus 10 independently from the CPU 13 of the main controller 12. The sub CPU 21 can control the electronic apparatus 10 without depending on the operating status of the main controller 12. After the main controller 12 carries out the user authentication by using the first authentication information, the sub CPU 21 carries out the user authentication in accordance with the second authentication information received from the remote operating device 30 via the P2P (Peer to Peer) communication. Then, the sub CPU 21 controls the electronic apparatus 10 in accordance with the remote operation from the remote operating device 30.

The nonvolatile memory 22 is a memory (flash memory) in which the stored contents are not damaged even if the electronic apparatus 10 is turned off. The nonvolatile memory 22 is used for storing various types of setting information and the like. Further, in the nonvolatile memory 22, the second authentication information which is used when the sub CPU 21 carries out the user authentication (second user authentication), is stored.

The remote operating device 30 is a PC or the like for remotely operating the electronic apparatus 10, and is connected to the electronic apparatus 10 via a network or the like. In the embodiment, the remote operating device 30 stores the browser for communicating with the main controller 12 via a web server by the http protocol. After the user authentication carried out by the main controller 12, the remote operating device 30 receives the KVM remote panel plug-in for remotely operating the electronic apparatus 10 via the sub-controller 20, from the main controller 12. Then, the remote operating device 30 communicates with the sub-controller 20 by using the KVM remote panel plug-in via the P2P communication.

The remote operating device 30 comprises a monitor for displaying the remote panel for remotely operating the electronic apparatus 10 and an operating unit, such as a keyboard, a mouse and the like.

Next, the user authentication carried out by the control unit 11 of the electronic apparatus 10 and the remote operation which is carried out for the electronic apparatus 10 by the remote operating device 30, will be explained.

Figure 2:
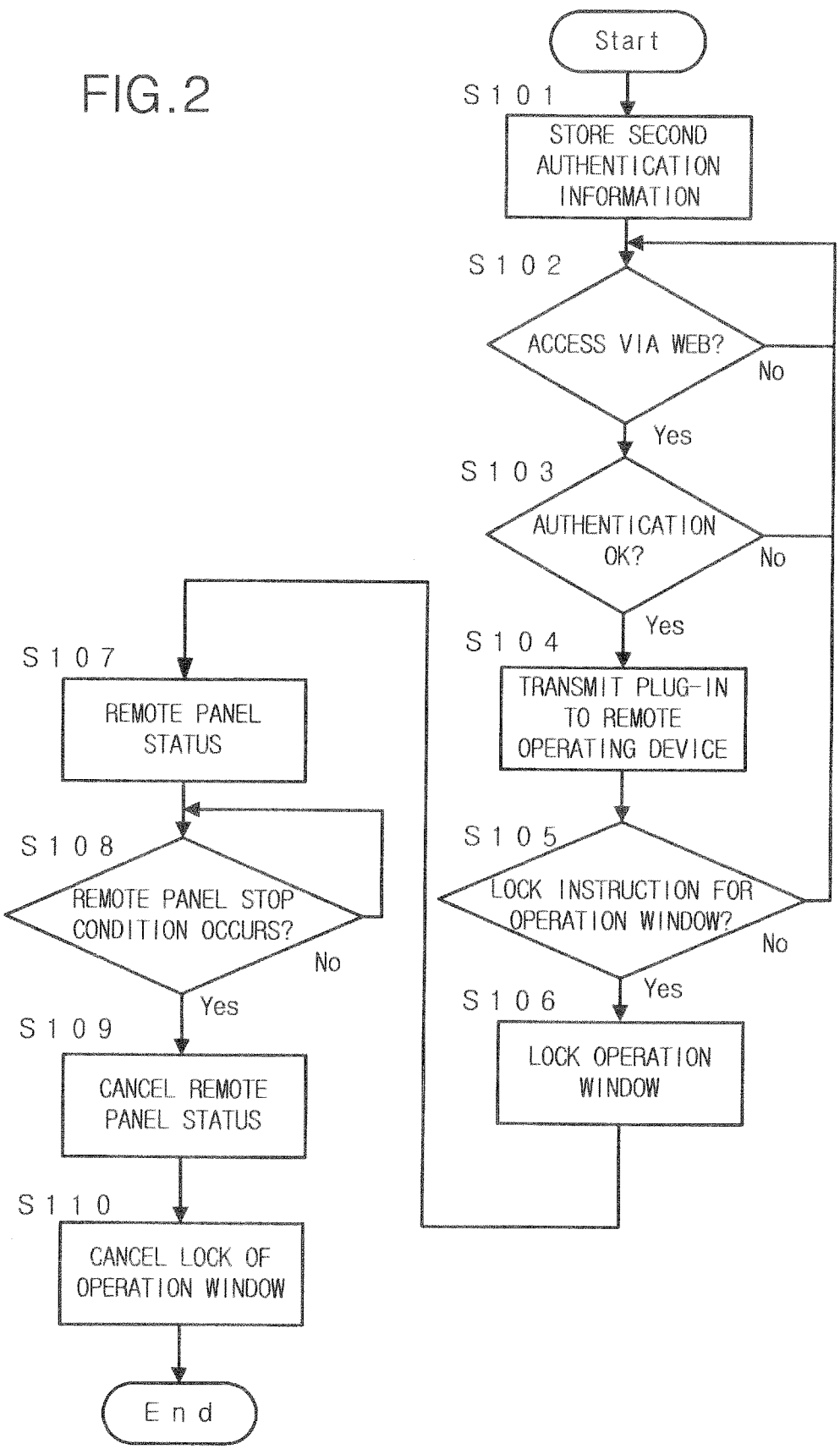
FIG. 2 is a flowchart showing the operation of the main controller in the user authentication carried out by the main controller and the remote operation carried out by the remote operating device.
Figure 3:
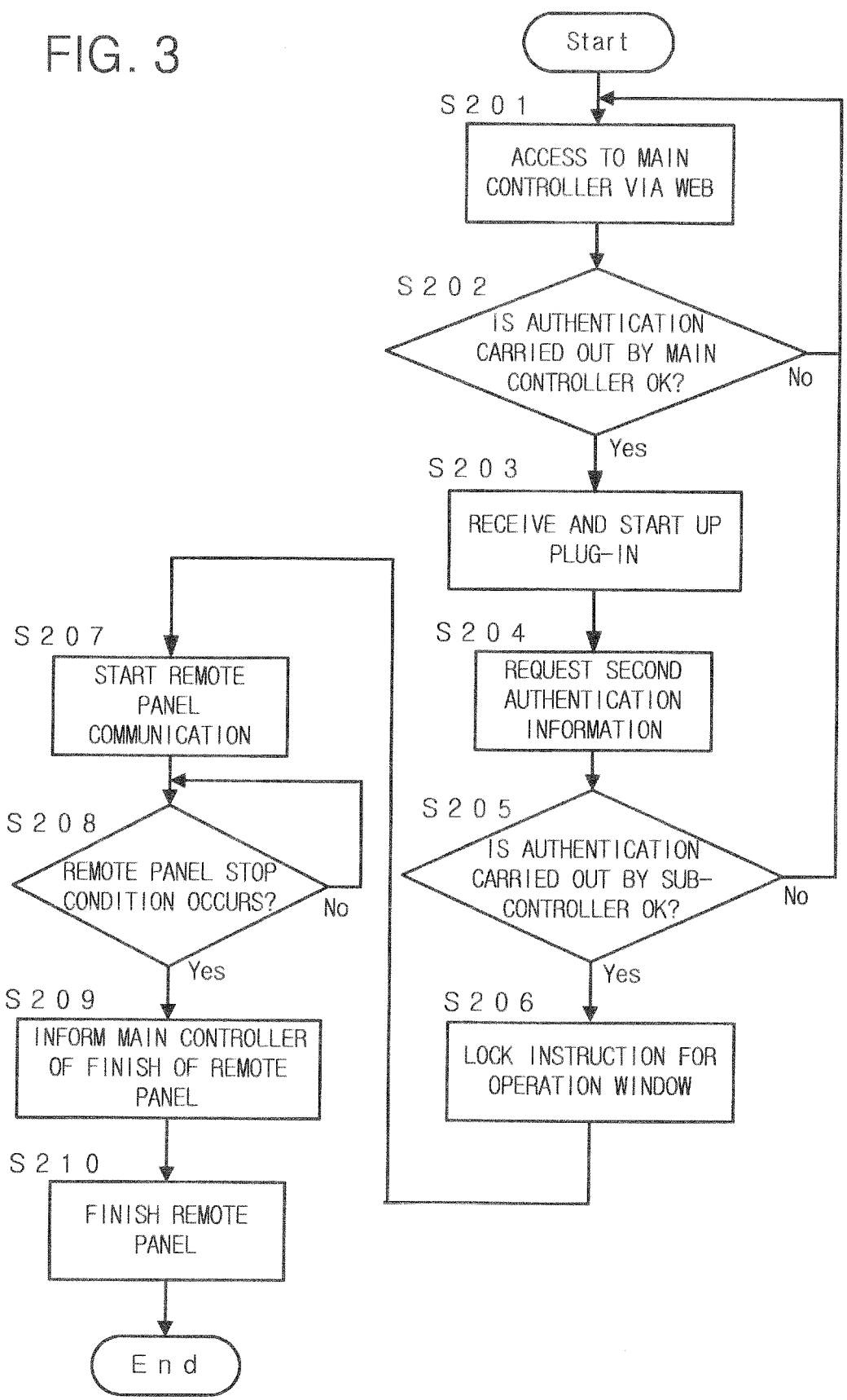
FIG. 3 is a flowchart showing the operation of the remote operating device in the user authentication carried out by the main controller, the user authentication carried out by the sub-controller and the remote operation carried out by the remote operating device.
Figure 4:
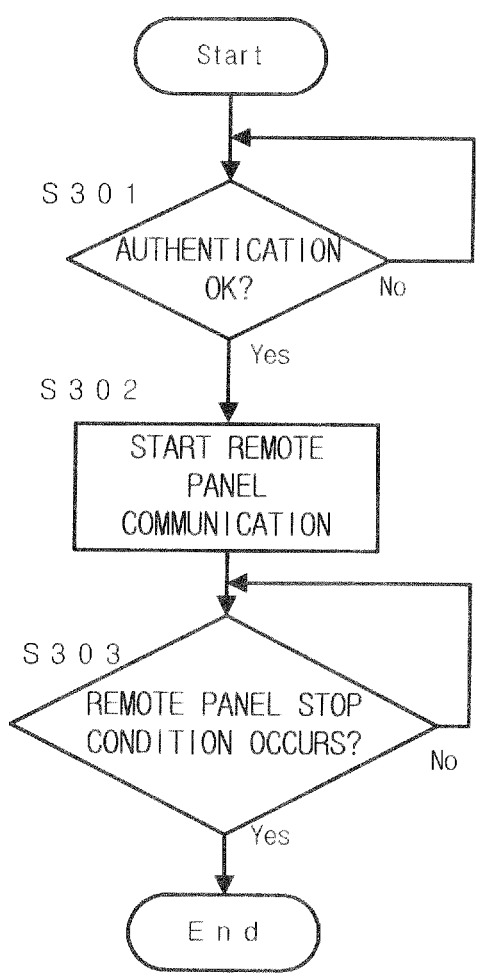
FIG. 4 is a flowchart showing the operation of the sub-controller in the user authentication carried out by the sub-controller and the remote operation carried out by the remote operating device.
Figure 5:
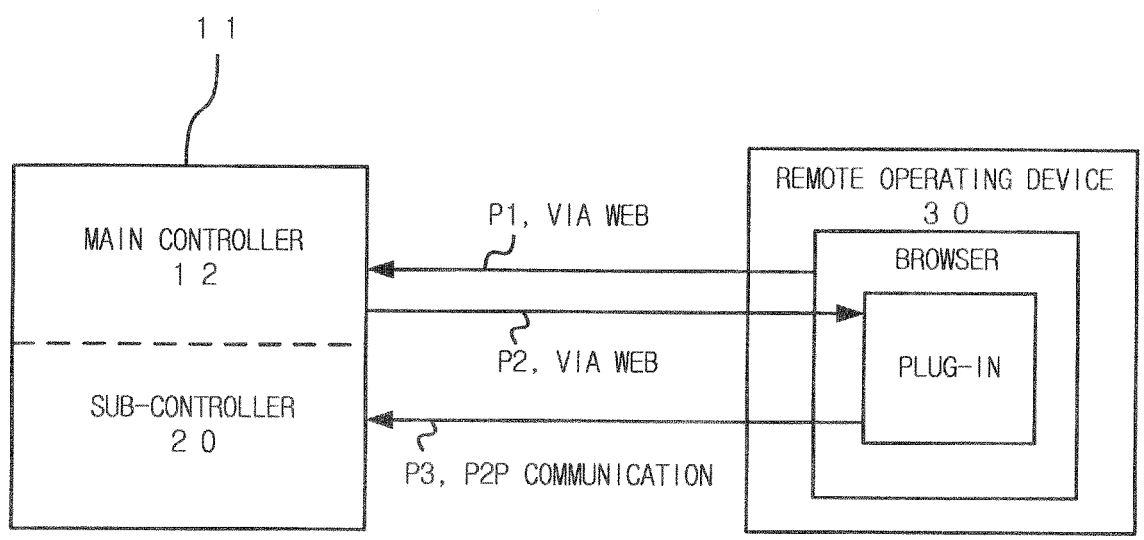
FIG. 5 is an explanatory view showing the transmission/reception of the authentication information and the plug-in between the electronic apparatus and the remote operating device.

FIG. 2 is a flowchart showing the operation of the main controller 12 in the user authentication carried out by the main controller 12 and the remote operation carried out by the remote operating device 30. FIG. 3 is a flowchart showing the operation of the remote operating device 30 in the user authentication carried out by the main controller 12, the user authentication carried out by the sub-controller 20 and the remote operation carried out by the remote operating device 30. FIG. 4 is a flowchart showing the operation of the sub-controller 20 in the user authentication carried out by the sub-controller 20 and the remote operation carried out by the remote operating device 30. FIG. 5 is an explanatory view showing the transmission/reception of the authentication information and the plug-in between the electronic apparatus 10 and the remote operating device 30.

In the nonvolatile memory 15 of the main controller 12, the second authentication information which is used when the sub-controller 20 carries out the user authentication, is stored (Step S101). In this embodiment, the administrator of the electronic apparatus 10 or the like instruct the main controller 12 store the second authentication information in the nonvolatile memory 15 by using the operation panel 14. Then, the main controller 12 of the electronic apparatus 10 monitors the access from the operating device 30 (Step S102; No).

The remote operating device 30 accesses to the main controller 12 of the electronic apparatus 10 in order to remotely operate the electronic apparatus 10 (Step S201). At the same time, the remote operating device 30 transmits the first authentication information which is used when the main controller 12 carries out the user authentication (P1). When the main controller 12 detects the access from the remote operating device 30 (Step S102; Yes), the main controller 12 carries out the user authentication in accordance with the first authentication information received from the remote operating device 30 (Step S103).

When the main controller 12 permits the access from the remote operating device 30 by the user authentication in accordance with the first authentication information (Step S103; Yes), the main controller 12 transmits the KVM remote panel plug-in stored in the nonvolatile memory 15 to the remote operating device 30 (Step S104, P2). On the other hand, when the main controller 12 does not permit the above access (Step S103; No), the process returns to Step S102.

When the main controller 12 permits the access (Step S202; Yes), the remote operating device 30 receives the KVM remote panel plug-in from the main controller 12 (P2) and starts up the KVM panel plug-in, (Step S203). Then, the remote operating device 30 requests the main controller 12 to transmit the second authentication information to the remote operating device 30 by using the KVM remote panel plug-in (Step S204).

When the main controller 12 is requested by the remote operating device 30 to transmit the second authentication information, the main controller 12 transmits the second authentication information stored in the nonvolatile memory 15, to the remote operating device 30.

When the remote operating device 30 receives the second authentication information and accesses to the sub-controller 20, the remote operating device 30 transmits the second authentication information to the sub-controller 20 via the P2P communication by using the KVM remote panel plug-in (P3).

When the sub-controller 20 receives the second authentication information, the CPU 21 of the sub-controller 20 carries out the user authentication in accordance with the received second authentication information and the second authentication information stored in the nonvolatile memory 22 (Step S301).

When the sub-controller 20 permits the access from the remote operating device 30 by the user authentication in accordance with the above second authentication information (Step S301; Yes), the sub-controller 20 starts the remote panel communication with the remote operating device 30 (Step S302).

When the sub-controller 20 permits the access (Step S205; Yes), the remote operating device 30 instructs the main controller 12 to lock the operation window of the operation panel 14 in order to remotely operate the electronic apparatus 10 (Step S206). Then, the remote operating device 30 starts the remote panel communication with the sub-controller 20 (Step S207). On the other hand, when the sub-controller 20 does not permit the access (Step S205; No), the process returns to Step S201.

When the main controller 12 receives the lock instruction for locking the operation window from the remote operating device 30 (Step S105; Yes), the main controller 12 locks the operation window of the operation panel 14 (Step S106) and transitions to the remote panel status (Step S107). In the remote panel status, the main controller 12 waits various types of operations until the remote panel stop condition (for example, the case in which the user or the like finishes the use of the remote panel communication, the case in which the above remote panel communication is disconnected, the case in which the main controller 12 detects the push of the lock cancel button on the operation panel 14, and the like) occurs.

On the other hand, when the main controller 12 does not receive the above lock instruction for locking the operation window within the predetermined time since the KVM remote panel plug-in is transmitted (Step S105; No), the main controller 12 judges that the sub-controller 20 does not permit the access from the remote operating device 30. Then, the process returns to Step S102.

While the remote panel communication is carried out between the remote operating device 30 and the sub-controller 20, the main controller 12, the sub-controller 20 and the remote operating device 30 monitor the occurrence of the remote panel stop condition (the finish of the remote operation which is carried out for the electronic apparatus 10 by the remote operating device 30), respectively (Step S108; No, Step S208; No, and Step S303; No).

When the remote panel stop condition (for example, the case in which the remote operating device 30 informs the sub-controller 20 of the finish of the remote panel communication, the case in which the remote panel communication is disconnected, and the like) occurs between the sub-controller 20 and the remote operating device 30 (Step S208; Yes and Step S303; Yes), the remote operating device 30 informs the main controller 12 of the finish of the remote panel communication (Step S209). Then, the remote operating device 30 finishes the remote panel communication (Step S210).

When the main controller 12 receives the information indicating the finish of the remote panel communication from the remote operating device 30 (Step S108; Yes), the main controller 12 cancels the remote panel status (Step S109). Further, the main controller 12 cancels the lock of the operation window of the operation panel 14, which is carried out in Step S106 (Step S110).

On the other hand, in the main controller 12, the remote panel stop condition (for example, the case in which the main controller 12 detects the push of the lock cancel button of the operation panel 14, or the like) occurs (Step S108; Yes), the main controller 12 cancels the above remote panel status (Step S109) and cancels the lock of the operation window of the operation panel 14 (Step S110). Further, the main controller 12 instructs the remote operating device 30 to forcedly finish the above remote panel communication. Then, the remote operating device 30 finishes the remote panel communication.

Next, the modified examples of the user authentication carried out by the control unit 11 of the electronic apparatus 10 will be explained. In the following modified examples, the control unit 11 is designed so that the CPU 13 of the main controller 12 can obtain the second authentication information stored in the nonvolatile memory 22 of the sub-controller 20, or so that the CPU 13 can write the second authentication information in the nonvolatile memory 22.

Modified Example 1

Figure 6:
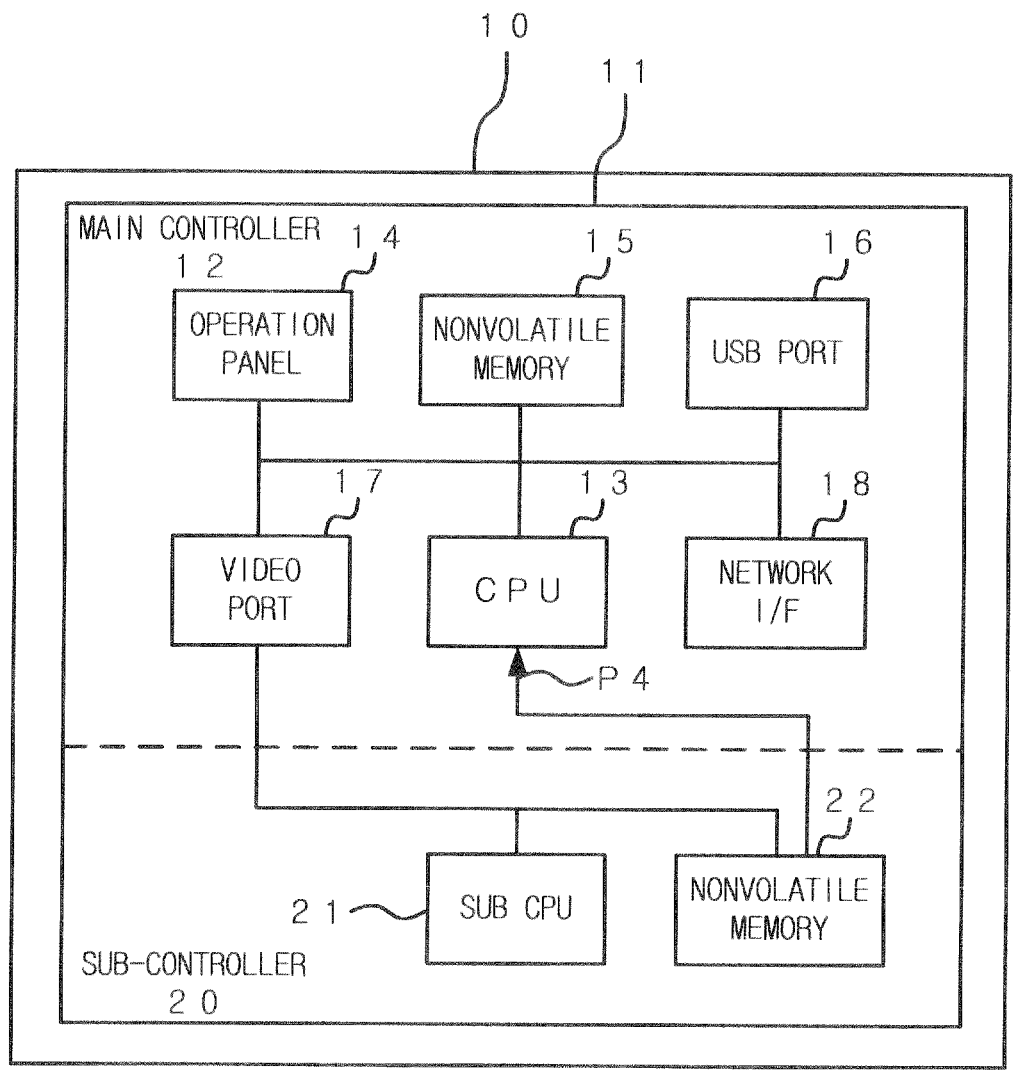
FIG. 6 is an explanatory view showing the operation in which the main controller obtains the second authentication information stored in the nonvolatile memory of the sub-controller in the modified example 1.

In the embodiment, the case in which the administrator or the like of the electronic apparatus 10 instructs the main controller 12 to store the second authentication information in the nonvolatile memory 15 by using the operation panel 14 in Step S101, is explained. In the modified example 1, as shown in FIG. 6, the CPU 13 of the main controller 12 obtains the second authentication information stored in the nonvolatile memory 22 of the sub-controller 20 (P4). After the main controller 12 carries out the first user authentication, the main controller 12 transmits the obtained second authentication information to the remote operating device 30.

Thereby, it is possible to omit the troublesome task in which the administrator or the like of the electronic apparatus 10 instructs the main controller 12 to store the second authentication information in the nonvolatile memory 15 by using the operation panel 14.

Modified Example 2

Figure 7:
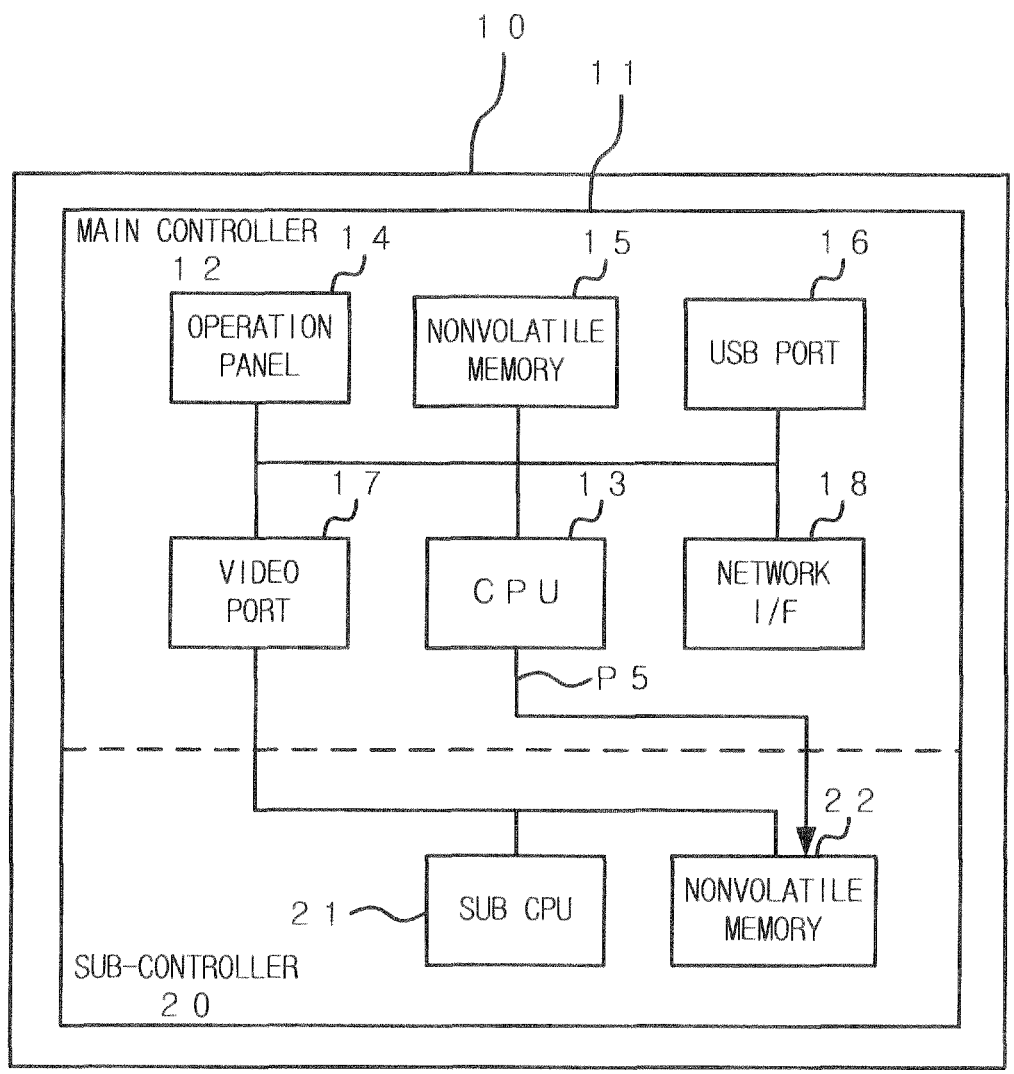
FIG. 7 is an explanatory view showing the operation in which the main controller writes the second authentication information of the user to whom the first authentication information is assigned, in the nonvolatile memory of the sub-controller in the modified example 2.

In the embodiment, the case in which the second authentication information has been already stored in the nonvolatile memory 22 of the sub-controller 20, is explained. In the modified example 2, as shown in FIG. 7, the CPU 13 of the main controller 12 writes the second authentication information of the user to whom the first authentication information used when the user authentication is carried out is assigned, in the nonvolatile memory 22 (P5).

Figure 8:
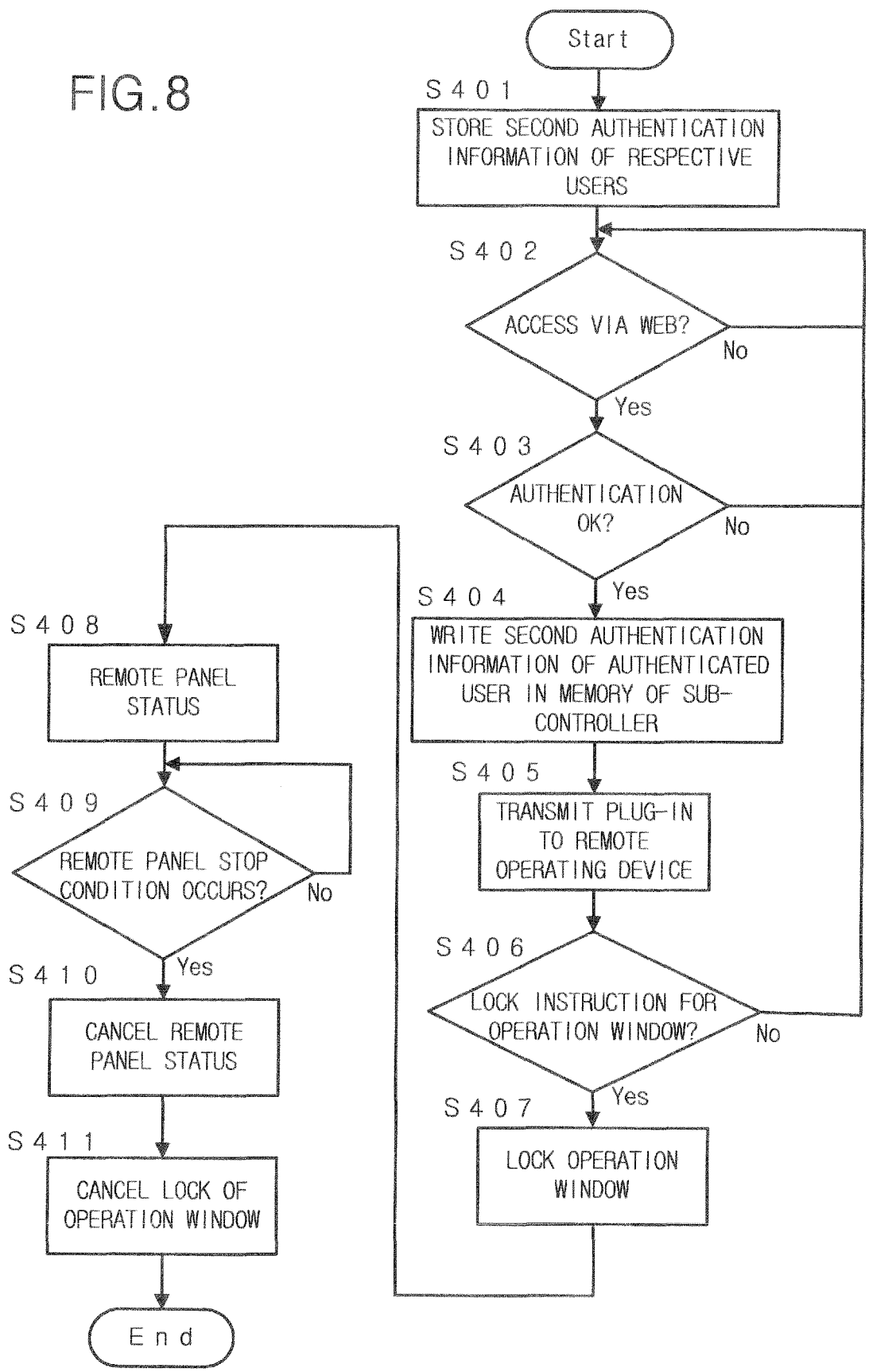
FIG. 8 is a flowchart showing the operation of the main controller in the user authentication in the modified example 2.

FIG. 8 is the flowchart showing the operation of the main controller 12 in the user authentication in the modified example 2.

In the nonvolatile memory 15 (storing unit) of the main controller 12, the second authentication information of each of a plurality of users, which is used when the sub-controller 20 carries out the user authentication (second user authentication) is stored (Step S401). In this example, the administrator or the like of the electronic apparatus 10 instructs the main controller 12 to store the second authentication information in the nonvolatile memory 15 by using the operation panel 14. Further, the above first authentication information and the second authentication information is assigned to each of the plurality of users.

The main controller 12 of the electronic apparatus 10 monitors the access from the remote operating device 30 (Step S402; No). When the main controller 12 detects the above access (Step S402; Yes), the main controller 12 receives the first authentication information which is used when the main controller 12 carries out the user authentication (first user authentication), from the remote operating device 30. Then, the CPU 13 extracts the first authentication information of the user who accesses from the remote operating device 30 (first authentication information corresponding to the user who remotely operates the electronic apparatus 10) from the first authentication information of the respective users, which is stored in the nonvolatile memory 15 (storing unit), and carries out the user authentication in accordance with the extracted first authentication information (Step S403).

When the CPU 13 permits the access from the remote operating device 30 by the user authentication in accordance with the first authentication information (Step S403; Yes), the CPU 13 extracts the second authentication information of the user to whom the extracted first authentication information is assigned (second authentication information corresponding to the user for whom the first user authentication is carried out) from the second authentication information of the respective users, which is stored in the nonvolatile memory 15. Further, the CPU 13 transmits the extracted second authentication information to the sub-controller 20 and writes (stores) the transmitted second authentication information in the nonvolatile memory 22 (Step S404). Then, when the second authentication information is requested by the remote operating device 30, the CPU 13 transmits the above extracted second authentication information, to the remote operating device 30.

The other operations of the main controller 12 (Step S405 to Step S411) are substantially the same as those in, the embodiment (Step S104 to Step S110). Therefore, the explanation thereof is omitted. Further, because the operation of the remote operating device 30 and the operation of the sub-controller 20 are substantially the same as those in the embodiment (FIG. 3 and FIG. 4), the explanation thereof is omitted.

In the modified example 2, the main controller 12 extracts the second authentication information of the user to whom the extracted first authentication information is assigned from the second authentication information of the respective users, which is stored in the nonvolatile memory 15, and writes the extracted second authentication information in the nonvolatile memory 22 of the sub-controller 20. Therefore, the authentication system 1 becomes secured as compared with the case in which only one pattern of the second authentication information is used.

Further, in the embodiment and the modified examples, in order to certainly carry out the user authentication by the main controller 12 when the next remote operation is carried out for the electronic apparatus 10, for example, when the remote panel communication is finished, the main controller 12 may instruct the remote operating device 30 to delete the plug-in transmitted to the remote operating device 30. Alternatively, in the modified example 1, in the nonvolatile memory 22 of the sub-controller 20, the second authentication information is stored as a one-time password. Whenever the main controller 12 obtains the second authentication information from the nonvolatile memory 22, the second authentication information may be rewritten. Further, in the modified example 2, in the nonvolatile memory 15 of the main controller 12, the second authentication information is stored as a one-time password. Whenever the main controller 12 transmits the second authentication information to the second operating device 30, the second authentication information may be rewritten.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the embodiment and the modified examples, when the user authentication is carried out by the main controller 12, the remote operating device 30 transmits the first authentication information via the web by the http protocol. However, the present invention is not limited to this. As long as the remote operating device 30 transmits the first authentication information to the main controller 12, any communication protocol can be used. Further, when the user authentication is carried out by the sub-controller 20, the second authentication is transmitted via the P2P communication. However, as long as the remote operating device 30 remotely operates the electronic apparatus 10 via the sub-controller 20, any communication method can be adapted.

Further, in the embodiment, the remote operating device 30 carries out the remote panel communication with the sub-controller 20 by using the KVM remote panel plug-in. However, as long as the remote operating device 30 remotely operates the electronic apparatus 10 via the sub-controller 20, any remote operating method can be adapted.

One of the objects a above embodiment is to provide an authentication system, an electronic apparatus and an authentication method in which the main controller certainly authenticates the user in the electronic apparatus comprising the main controller and the sub-controller which is independent from the main controller.

In the above embodiment or at least one of the above modified examples, after the main controller carries out the user authentication, the sub-controller carries out the user authentication. Therefore, the main controller can certainly authenticate the user.

In the above embodiment or at least one of the above modified examples, after the main controller carries out the first user authentication, the main controller transmits the authentication information for carrying out the second user authentication by the sub-controller, to the remote operating device. Therefore, it is possible to omit the troublesome task in which the user or the like of the remote operating device enters the above authentication information.

In the above embodiment or at least one of the above modified examples, the main controller obtains the authentication information for carrying out the second user authentication by the sub-controller, from the sub-controller. Therefore, it is possible to omit the troublesome task in which the administrator or the like of the electronic apparatus previously registers the above authentication information to the main controller.

In the above embodiment or at least one of the above modified examples, the main controller transmits the second authentication information of the user to whom the first authentication information is assigned, which is extracted from the second authentication information of the respective users stored in the storing unit, to the remote operating device and the sub controller. The sub-controller carries out the second user authentication in accordance with the second authentication information received from the main controller. Therefore, the authentication system becomes secured as compared with the case in which only one pattern of the second authentication information is used.

In the above embodiment or at least one of the above modified examples, after the first user authentication is carried out, the main controller transmits the plug-in for remotely operating the electronic apparatus via the sub-controller, to the remote operating device. Therefore, in the remote operating device, it is possible to make the situation in which the remote operation is easily carried out for the electronic apparatus via the sub-controller after the first user authentication.

In the above embodiment or at least one of the above modified examples, after the sub-controller carries out the second user authentication, the main controller locks the operation window of the electronic apparatus. Therefore, it is possible to prevent the discrepancy between the operation from the operation panel of the electronic apparatus and the remote operation from the remote operating device.

In the above embodiment or at least one of the above modified examples, after the remote operation which is carried out for the electronic apparatus by the remote operating device is finished, the main controller cancels the lock of the operation window of the electronic apparatus. Therefore, the user or the like can use the operation window of the electronic apparatus after the above remote operation is finished.

According to the authentication system, the electronic apparatus and the authentication method, the main controller can certainly authenticate the user even in the electronic apparatus comprising the main controller and the sub-controller which is independent from the main controller.

The present U.S. patent application claims the priority of Japanese Patent Application No. 2012-74326, filed on Mar. 28, 2012, according to the Paris Convention, and the entirety of which is incorporated herein by reference for correction of incorrect translation.

What is claimed is:

1. An authentication system comprising:
    an electronic apparatus; and
    a remote operating device to remotely operate the electronic apparatus,
    wherein the electronic apparatus comprises a main controller to control the electronic apparatus and a sub-controller to control the electronic apparatus independently from the main controller;
    wherein, in a case in which the remote operating device accesses the electronic apparatus, upon the remote operating device accessing the electronic apparatus, the main controller carries out a first user authentication for authenticating the remote operating device in accordance with first authentication information received from the remote operating device, and, after the remote operating device is authenticated by the first user authentication carried out by the main controller, the sub-controller carries out a second user authentication for authenticating the remote operating device in accordance with second authentication information received from the remote operating device; and
    wherein the main controller comprises a first CPU (Central Processing Unit), and the sub-controller comprises a second CPU (Central Processing Unit) which is independent of the first CPU and which controls the electronic apparatus in accordance with remote operation from the remote operating device.

2. The authentication system of claim 1, wherein:
    the main controller comprises a storing unit to store the second authentication information for carrying out the second user authentication by the sub-controller,
    after the main controller carries out the first user authentication, the main controller transmits the second authentication information to the remote operating device,
    when the remote operating device accesses to the sub-controller, the remote operating device transmits the second authentication information received from the main controller to the sub-controller, and
    the sub-controller carries out the second user authentication in accordance with the second authentication information received from the remote operating device.

3. The authentication system of claim 2, wherein the main controller obtains the second authentication information for carrying out the second user authentication by the sub-controller, from the sub-controller, and transmits the obtained second authentication information to the remote operating device.

4. The authentication system of claim 1, wherein:
    the main controller comprises a storing unit to store the first authentication information for carrying out the first user authentication by the main controller, and to store the second authentication information for carrying out the second user authentication by the sub-controller, the first authentication information being assigned to a plurality of users, respectively, and the second authentication information being assigned to the plurality of users, respectively,
    after the main controller carries out the first user authentication in accordance with the first authentication information corresponding to a user who remotely operates the electronic apparatus, from the first authentication information stored in the storing unit, the main controller transmits the second authentication information corresponding to the user for whom the first user authentication is carried out, from the second authentication information stored in the storing unit, to the remote operating device and the sub-controller,
    when the remote operating device accesses the sub-controller, the remote operating device transmits the second authentication information received from the main controller, to the sub-controller, and
    the sub-controller carries out the second user authentication in accordance with the second authentication information received from the remote operating device and the second authentication information received from the main controller.

5. The authentication system of claim 1, wherein after the main controller carries out the first user authentication, the main controller transmits a plug-in for remotely operating the electronic apparatus via the sub-controller, to the remote operating device.

6. The authentication system of claim 1, wherein after the sub-controller carries out the second user authentication, the main controller carries out a lock of an operation window of the electronic apparatus.

7. The authentication system of claim 6, wherein after a remote operation which is carried out for the electronic apparatus by the remote operating device is finished, the main controller cancels the lock of the operation window of the electronic apparatus.

8. An electronic apparatus, comprising:
    a main controller to control the electronic apparatus; and
    a sub-controller to control the electronic apparatus independently from the main controller,
    wherein in a case in which the electronic apparatus receives access from a remote operating device, upon the remote operating device accessing the electronic apparatus, the main controller carries out a first user authentication for authenticating the remote operating device in accordance with first authentication information received from the remote operating device, and, after the remote operating device is authenticated by the first user authentication carried out by the main controller, the sub-controller carries out a second user authentication for authenticating the remote operating device in accordance with second authentication information received from the remote operating device, and
    wherein the main controller comprises a first CPU (Central Processing Unit), and the sub-controller comprises a second CPU (Central Processing Unit) which is independent of the first CPU and which controls the electronic apparatus in accordance with remote operation from the remote operating device.

9. The electronic apparatus of claim 8, wherein:
    the main controller comprises a storing unit to store the second authentication information for carrying out the second user authentication by the sub-controller,
    after the main controller carries out the first user authentication, the main controller transmits the second authentication information to the remote operating device, and
    when the remote operating device accesses the sub-controller, the sub controller receives the second authentication information from the remote operating device, and carries out the second user authentication in accordance with the second authentication information.

10. The electronic apparatus of claim 9, wherein the main controller obtains the second authentication information for carrying out the second user authentication by the sub-controller, from the sub-controller, and transmits the obtained second authentication information to the remote operating device.

11. The electronic apparatus of claim 8, wherein:
the main controller comprises a storing unit to store the first authentication information for carrying out the first user authentication by the main controller, and to store the second authentication information for carrying out the second user authentication by the sub-controller, the first authentication information being assigned to a plurality of users, respectively, and the second authentication information being assigned to the plurality of users, respectively,
after the main controller carries out the first user authentication in accordance with the first authentication information corresponding to a user who remotely operates the electronic apparatus, from the first authentication information stored in the storing unit, the main controller transmits the second authentication information corresponding to the user for whom the first user authentication is carried out, from the second authentication information stored in the storing unit, to the remote operating device and the sub-controller, and
when the remote operating device accesses the sub-controller, the sub controller receives the second authentication information from the remote operating device, and carries out the second user authentication in accordance with the second authentication information received from the remote operating device and the second authentication information received from the main controller.

12. The electronic apparatus of claim 8, wherein after the main controller carries out the first user authentication, the main controller transmits a plug-in for remotely operating the electronic apparatus via the sub-controller, to the remote operating device.

13. The electronic apparatus of claim 8, wherein after the sub-controller carries out the second user authentication, the main controller carries out a lock of an operation window of the electronic apparatus.

14. The electronic apparatus of claim 13, after a remote operation which is carried out for the electronic apparatus by the remote operating device is finished, the main controller cancels the lock of the operation window of the electronic apparatus.

15. An authentication method which is carried out when a remote operation is carried out for an electronic apparatus by a remote operating device, the authentication method comprising:
carrying out a first user authentication by a main controller to control the electronic apparatus; and
carrying out a second user authentication by a sub-controller for authenticating the remote operating device in accordance with second authentication information received from the remote operating device to control the electronic apparatus independently from the main controller, upon the remote operating device accessing the electronic apparatus, the first user authentication is carried out for authenticating the remote operating device in accordance with first authentication information received from the remote operating device, and, after the remote operating device is authenticated by the first user authentication carried out by the main controller,
wherein the main controller comprises a first CPU (Central Processing Unit), and the sub-controller comprises a second CPU (Central Processing Unit) which is independent of the first CPU and which controls the electronic apparatus in accordance with remote operation from the remote operating device.

16. The authentication method of claim 15, further comprising:
storing the second authentication information by the main controller, the second authentication information being used for carrying out the second user authentication by the sub-controller;
performing first transmitting of the second authentication information to the remote operating device by the main controller after the first user authentication is carried out; and
performing second transmitting of the second authentication information received in the first transmitting, to the sub-controller by the remote operating device when the remote operating device accesses the sub-controller,
wherein in the carrying out of the second user authentication, the sub-controller carries out the second user authentication in accordance with the second authentication information received in the second transmitting.

17. The authentication method of claim 16, further comprising:
obtaining the second authentication information by the main controller from the sub-controller, the second authentication information being used for carrying out the second user authentication by the sub-controller,
wherein in the first transmitting, the main controller transmits the second authentication information obtained in the obtaining of the second authentication information, to the remote operating device.

18. The authentication method of claim 15, further comprising:
storing the first authentication information and the second authentication information by the main controller, the first authentication information being assigned to a plurality of users respectively and being used for carrying out the first user authentication by the main controller, and the second authentication information being assigned to the plurality of users respectively and being used for carrying out the second user authentication by the sub-controller;
performing first transmitting of the second authentication information corresponding to a user for whom the first user authentication is carried out, from the second authentication information stored in the storing of the second authentication information, to the remote operating device and the sub-controller by the main controller after the carrying out of the first user authentication; and
performing second transmitting of the second authentication information received in the first transmitting, to the sub-controller by the remote operating device when the remote operating device accesses the sub-controller,
wherein in the carrying out of the second user authentication, the sub-controller carries out the second user authentication in accordance with the second authentication information received in the first transmitting and the second authentication information received in the second transmitting.

19. The authentication method of claim 15, further comprising:
    transmitting a plug-in for remotely operating the electronic apparatus via the sub-controller, to the remote operating device by the main controller after the carrying out of the first user authentication.

20. The authentication method of claim 15, further comprising:
    carrying out a lock of an operation window of the electronic apparatus by the main controller after the sub-controller carries out the second user authentication.

21. The authentication method of claim 20, further comprising:
    cancelling the lock of the operation window of the electronic apparatus by the main controller after a remote operation which is carried out for the electronic apparatus by the remote operating device is finished.

* * * * *